Reissued May 6, 1924.

Re. 15,829

UNITED STATES PATENT OFFICE.

EMIL P. ENGELBRECHT, OF PITTSBURGH, PENNSYLVANIA, ASSIGNOR, BY DIRECT AND MESNE ASSIGNMENTS, TO TOUPET-TAYLOR ENGINEERING COMPANY, A CORPORATION OF PENNSYLVANIA.

SLATE BRICK.

No Drawing. Original No. 1,462,596, dated July 24, 1923, Serial No. 472,573, filed May 25, 1921. Application for reissue filed January 15, 1924. Serial No. 686,463.

*To all whom it may concern:*

Be it known that I, EMIL P. ENGELBRECHT, a citizen of the United States, residing at Pittsburgh, in the county of Allegheny and State of Pennsylvania, have invented certain new and useful Improvements in Slate Bricks, of which the following is a specification.

This invention relates to bricks, hollow blocks, tiles, and the like, and consists in a novel process for manufacturing such bricks, hollow blocks, tiles, and other articles which are required to be of the general nature of bricks. The invention consists also in the novel product produced by the carrying out of my process. For convenience, I shall refer herein to the products merely as bricks, but it is to be understood that in general the statements refer to hollow blocks, tiles, and other similar articles as well.

One of the purposes of my process is to produce bricks which will withstand very intense heat continuously for a long time, and hence are ordinarily called fireproof brick. Another purpose is to produce bricks of the nature that will be fully as effective as ordinary fireproof bricks, as to durability, looks, and the like, but that will be less expensive to manufacture.

The process which I have invented for manufacturing these bricks consists in using as the principal material therefor, what is ordinarily called "red dog." This is a substance which is formed from coal-mine slate, which is a grayish slaty substance which is formed in the shape of veins in coal beds, and is separated from the coal as it is mined, and ordinarily thrown out as waste. This slate is thrown out by the miners into enormous piles of thousands of tons, and spontaneous combustion arises therein, and the combustible substances contained in the slate, such as sulphur, and the like, are burned out. This burned substance is called "red dog."

My invention consists in taking this burned slate and crushing it and then grinding it into fine particles, somewhat smaller than ordinary grains of sand. I prefer to grind it up until the larger particles are no more than about one-sixteenth of an inch thick. I then add a small proportion of unslacked lime, or other similar binder, in the neighborhood of from three to five per cent; the greater the percentage of binder, the stronger the brick. For the best quality of fireproof brick, about five per cent of lime or other binder is used.

This ground slate and lime is then mixed thoroughly and is passed into a grinding mill, and the mixture is thoroughly ground together with a suitable amount of water. Just enough water is used to properly slack the lime, or to render the binder and the entire mixture plastic, without any surplus water, the mixture, therefore, remaining substantially dry. The exact amount of water used depends upon the condition of the mixture, the slate sometimes containing more or less moisture.

My invention consists in part in grinding this mixture properly, the object being to much more thoroughly mix the substances by grinding in conjunction with the proper amount of water, so as to cement together with the binder as great a surface area of the grains of slate as is possible, thereby making the brick stronger and less liable to be disintegrated by intense heat or cold. The amount of grinding, however, depends upon the quality and nature of the bricks desired, and the exact amount being more or less immaterial. The grinding, however, is carried on while the mixture is still moist and the lime is slacking, and it is continued until a coherent mass is formed which will not crumble apart when pressed together. A suitable test is to take a mass in the hands and pack it together, and then press the thumb into the mass. If the mass then merely breaks apart in one or two pieces, but does not crumble to pieces, the grinding process has reached the final stage. If the mass crumbles, the grinding is not sufficient, or if it is so coherent or plastic as not to break apart at all, the amount of moisture is too great, or the grinding is too much.

The ground material is then passed into the brick-press. Any ordinary brick-press may be used. The material is then put under a pressure in the neighborhood of two and one-half tons per square inch; the amount of pressure depending upon the density of the brick desired. The bricks are then passed in a heating chamber, which usually consists of a long tubular casing, and steam is passed into the casing, and the bricks are heated thereby for about nine hours, the steam being kept at a pressure of about 125 pounds. At the end of this heating, the bricks are completed.

If the process is properly carried out, fire-proof bricks are obtained which will stand a continuous temperature of 2285 degrees Fahrenheit. The bricks can be used for building walls, foundations, and the like, or wherever they will be exposed to intense temperature; and tiles and other articles for mosaic work or the like may be made in a similar manner. The surfaces of the articles may be enameled or colored in any ordinary manner, and wherever unusual strength is desired, as in foundations, or wherever resistance to great crushing strains is necessary, cement may be substituted for lime as a binder.

I claim as my invention:

1. The process of manufacturing bricks and the like consisting in mixing with burned and granulated coal-mine slate a proportionately small amount of unslacked lime, in adding an amount of water sufficient to substantially slack the lime used, in grinding the mixture together until it forms a coherent mass, in pressing the ground mixture into proper shape under a pressure of from two to two and one-half tons per square inch, and in heating the pressed articles for about nine hours in a bath of steam under a pressure of about one hundred and twenty-five pounds.

2. The process of manufacturing bricks consisting in adding to burned and granulated coal-mine slate from three to five per cent of unslacked lime with sufficient water to substantially slack the lime, in grinding the mixture until it forms a coherent mass, in pressing the bricks under a pressure of about two and a half tons per square inch, and in heating the bricks for substantially nine hours at a temperature of about three hundred and fifty degrees Fahrenheit.

3. The process of manufacturing bricks and the like consisting in mixing with burned and granulated coal-mine slate a proportionately small amount of suitable binding element, adding sufficient water to render the mixture plastic, grinding the mixture together until it is thoroughly commingled and forms a coherent mass, subjecting the mixture to pressure and shaping unitary portions to desired form.

4. The process of manufacturing bricks and the like consisting in mixing with burned and granulated coal-mine slate a proportionately small amount of suitable binding element, adding sufficient water to render the mixture plastic, grinding the mixture together until it is thoroughly commingled and forms a coherent mass, subjecting the mixture to pressure and shaping unitary portions to desired form, and finally subjecting the formed units to heat.

5. The process of manufacturing bricks and the like consisting in mixing with burned and granulated coal-mine slate, commonly known as "red dog," a proportionately small amount of suitable binding element, adding sufficient water to render the mixture plastic, grinding the mixture together until it is thoroughly commingled and forms a coherent mass, subjecting the mixture to pressure and shaping unitary portions to desired form, and finally subjecting the formed units to heat.

6. An article of manufacture composed of a mixture of burned and granulated coal-mine slate, and a proportionately small amount of unslacked lime, with sufficient moisture to substantially slack the lime, the mixture being suitably ground together and pressed into shape, and heated for substantially nine hours at a temperature of about three hundred and fifty degrees Fahrenheit.

7. An article of manufacture composed of a mixture of burned and granulated coal-mine slate and a proportionately small amount of binding agent, sufficient moisture to render such binding agent effective, the entire mixture being ground and thoroughly mixed and pressed into shape, and then subjected to heat.

8. An article of manufacture composed of a mixture of burned and granulated coal-mine slate and a proportionately small amount of cementitious binding agent, sufficient moisture to render such binding agent effective, the entire mixture being ground and thoroughly mixed and pressed into shape.

9. An article of manufacture composed of a mixture of burned and granulated coal-mine slate commonly known as "red dog" and a proportionately small amount of binding agent, sufficient moisture to render such binding agent effective, the entire mixture being ground and thoroughly mixed and pressed into shape, and then subjected to heat.

10. An article of manufacture composed of a mixture of burned and granulated coal-mine slate commonly known as "red dog" and a proportionately small amount of binding agent.

In testimony whereof I affix my signature.

EMIL P. ENGELBRECHT.